(12) United States Patent
Sakaguchi

(10) Patent No.: US 7,212,239 B2
(45) Date of Patent: May 1, 2007

(54) DEVICE AND METHOD FOR IMAGE PICKUP WHICH CORRECTS DATA FOR THE PICKED-UP IMAGE

(75) Inventor: Norihiro Sakaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 673 days.

(21) Appl. No.: 10/235,715

(22) Filed: Sep. 6, 2002

(65) Prior Publication Data

US 2003/0044066 A1 Mar. 6, 2003

(30) Foreign Application Priority Data

Sep. 6, 2001 (JP) ............................. 2001-270852

(51) Int. Cl.
*H04N 9/64* (2006.01)
*H04N 5/228* (2006.01)
*H04N 5/222* (2006.01)

(52) U.S. Cl. ................ 348/251; 348/371; 348/222.1

(58) Field of Classification Search .............. 348/224.1, 348/234, 370, 371
See application file for complete search history.

(56) References Cited

U.S. PATENT DOCUMENTS

| | | | | |
|---|---|---|---|---|
| 4,745,466 | A * | 5/1988 | Yoshida et al. ............. | 358/517 |
| 5,047,861 | A * | 9/1991 | Houchin et al. ............ | 348/247 |
| 5,144,445 | A * | 9/1992 | Higashitsutsumi .......... | 348/294 |
| 5,534,916 | A | 7/1996 | Sakaguchi | |
| 5,774,623 | A | 6/1998 | Maeda et al. | |
| 6,075,562 | A | 6/2000 | Sakaguchi et al. | |
| 6,118,481 | A * | 9/2000 | Hamada ................... | 348/220.1 |
| 6,366,680 | B1 * | 4/2002 | Brunk et al. ................ | 382/100 |
| 6,628,833 | B1 * | 9/2003 | Horie ........................ | 382/173 |
| 6,822,690 | B2 * | 11/2004 | Iida ............................ | 348/364 |
| 6,833,862 | B1 * | 12/2004 | Li ............................. | 348/207.99 |
| 2001/0002850 | A1 * | 6/2001 | Slatter ........................ | 348/370 |
| 2001/0008423 | A1 * | 7/2001 | Nakamura ................... | 348/345 |
| 2001/0015761 | A1 * | 8/2001 | Yasuda ................... | 348/333.01 |
| 2002/0008760 | A1 * | 1/2002 | Nakamura ................... | 348/222 |
| 2002/0015103 | A1 * | 2/2002 | Shi ............................. | 348/348 |

FOREIGN PATENT DOCUMENTS

| | | |
|---|---|---|
| EP | 0 888 003 | 12/1998 |
| JP | 5-216095 | 8/1993 |
| JP | 6-121225 | 4/1994 |
| JP | 8-95114 | 4/1996 |
| JP | 8-327886 | 12/1996 |
| JP | 2000-89289 | 3/2000 |
| JP | 2000-278598 | 10/2000 |
| WO | WO 97/36427 | 10/1997 |

OTHER PUBLICATIONS

U.S. Appl. No. 10/235,715, filed Sep. 6, 2002, Sakaguchi.
U.S. Appl. No. 10/761,329, filed Jan. 22, 2004, Sakaguchi.
Patent Abstracts of Japan, JP 2001-223943, Aug. 17, 2001.
Patent Abstracts of Japan, JP 07-222049, Aug. 18, 1995.
U.S. Appl. No. 10/365,465, filed Feb. 13, 2003, Sakaguchi.
U.S. Appl. No. 10/358,322, filed Feb. 5, 2003, Sakaguchi et al.

* cited by examiner

*Primary Examiner*—Ngoc-Yen Vu
*Assistant Examiner*—Richard M. Bemben
(74) *Attorney, Agent, or Firm*—Oblon, Spivak, McClelland, Maier & Neustadt, P.C.

(57) ABSTRACT

An image pickup device includes a CCD which picks up an image of a subject, and a front end process or which corrects data for the picked-up image by a light quantity distribution correction table for correcting the data for the picked-up image based on a light quantity distribution when the image is photographed using a flash.

16 Claims, 10 Drawing Sheets

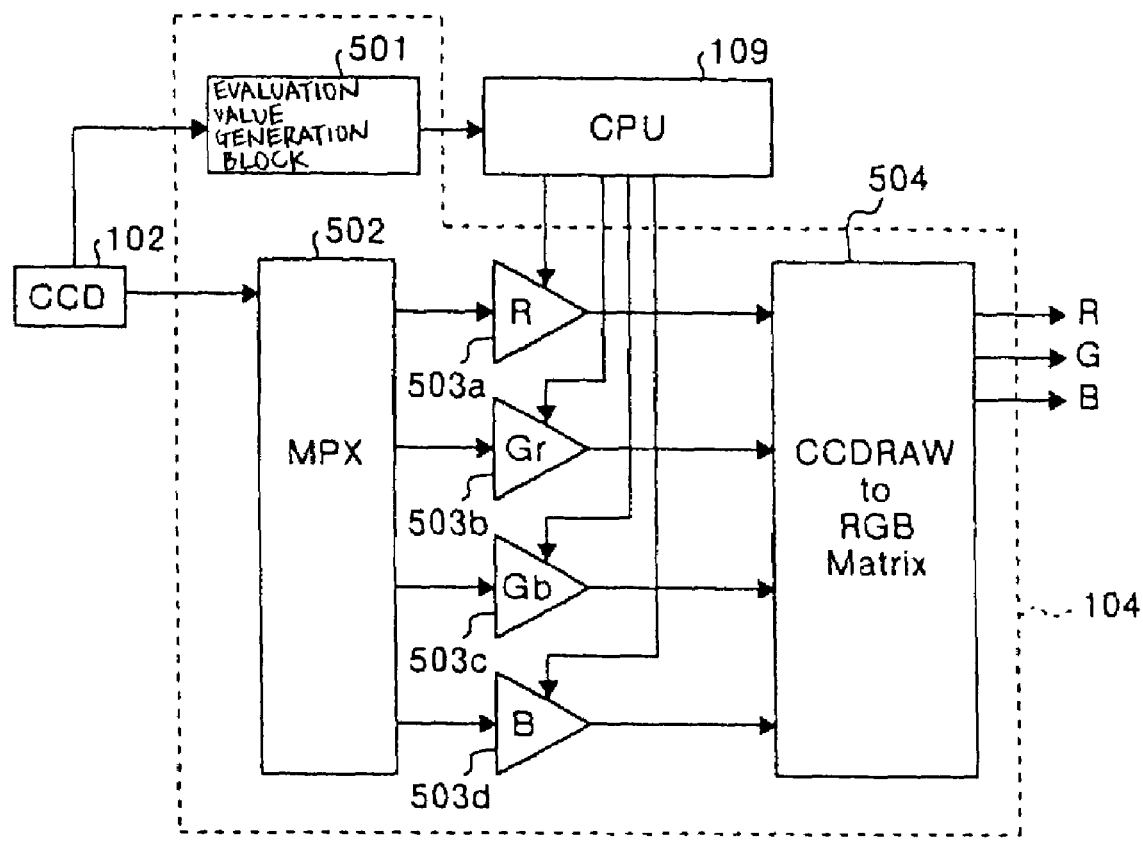

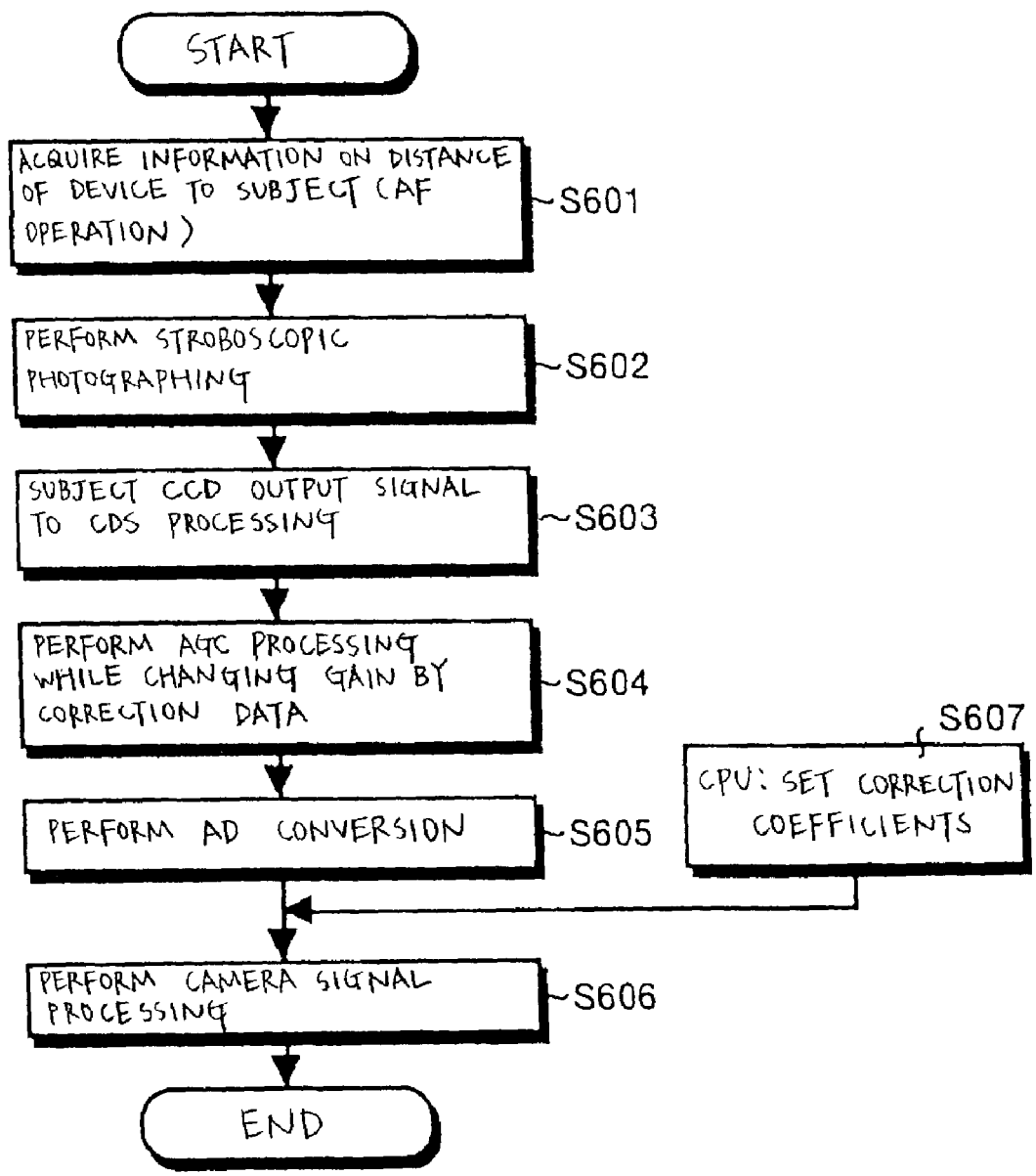

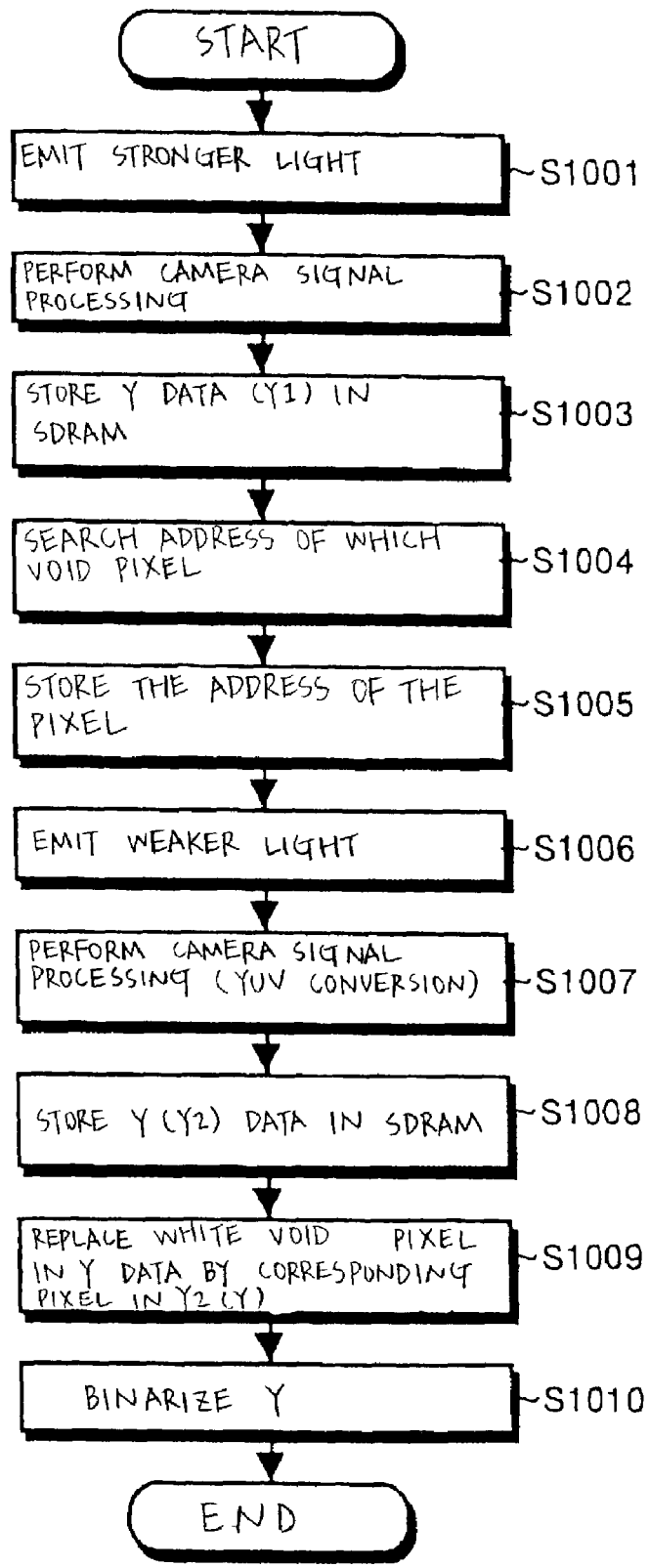

DEVICE AND METHOD FOR IMAGE PICKUP WHICH CORRECTS DATA FOR THE PICKED-UP IMAGE

BACKGROUND OF THE INVENTION

1) Field of the Invention

The present invention relates to an image pickup device and image pickup method. More particularly, this invention relates to a digital image pickup device.

2) Description of the Related Art

Most digital cameras as digital image pickup devices include an internal flash. It has been known that an image obtained by photographing a subject by a digital camera using a flash from a relatively short distance tends to be overexposed. The invention described in Japanese Patent Application Laid-Open Publication (JPA) No. 2000-278598 has been achieved to correct image data which is likely to be overexposed to thereby obtain an adequate image.

According to the invention described in JPA No. 2000-278598, a γ correction table is created. This table corresponds to a converted curve obtained by shifting the lowest luminance of an input signal in a reference conversion characteristic curve (which is used for γ correction) to the lowest luminance of an obtained input signal. The image data which is likely to be overexposed is processed by the conversion table thus created, whereby the unevenness of output image signals is corrected.

However, it is known that photographing using a flash by the digital camera has not only an overexposure problem explained above but also a problem that a picked-up image has uneven luminous intensity distribution. The uneven luminous intensity distribution is a phenomenon that occurs because of a long distance between an optical system and a flash in the digital camera. This phenomenon becomes more significant as a distance between a subject and the digital camera is shorter.

If a subject is photographed using a flash at a short distance by the digital camera, the quantity of light around an image is sometimes decreased by the shading of the optical system in the digital camera. In this case, the phenomenon as follows occurs. That is, the peripheral portion of the picked-up image darkens or the brightness of an image frame becomes uneven, and this phenomenon may possibly degrade the image. If the light quantity of the flash is increased to solve the problem of darkening of the peripheral portion of the image, a phenomenon of halation which causes any white void to appear in image processing, may occur in the central portion of the picked-up image frame, which may possibly degrade the image.

SUMMARY OF THE INVENTION

It is an object of the present invention to provide an image pickup device and image pickup method capable of obtaining a high-quality image irrespective of the distance between the device and a subject when the subject is photographed by the device using a flash.

The image pickup device with a flash according to one aspect of this invention comprises an image pickup unit which picks up an image of a subject, and a correction table recording unit which records a light quantity distribution correction table for correcting data for the image picked up by the image pickup unit, based on a light quantity distribution when the subject is photographed using the flash. The device also comprises an image pickup data correction unit which corrects the data for the image picked up by the image pickup unit, using the light quantity distribution correction table.

The image pickup method according to another aspect of this invention comprises the steps of picking up an image of a subject, and recording a light quantity distribution correction table used to correct data for the image picked up in the image pickup step, based on a light quantity distribution when the subject is photographed using the flash. This method also comprises a step of correcting the data for the picked-up image using the light quantity distribution correction table.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 is a block diagram showing the configuration of a DSP/JPEG processor which performs camera signal processing, FIG. 6 is a flow chart of processing performed by the DSP/JPEG processor when image pickup data is corrected, FIG. 10 is a flow chart of processing performed by an image pickup device according to a third embodiment of the present invention.

DETAILED DESCRIPTIONS

Embodiments of the image pickup device and image pickup method according to the present invention will be explained in detail below with reference to the accompanying drawings.

Figure 1:
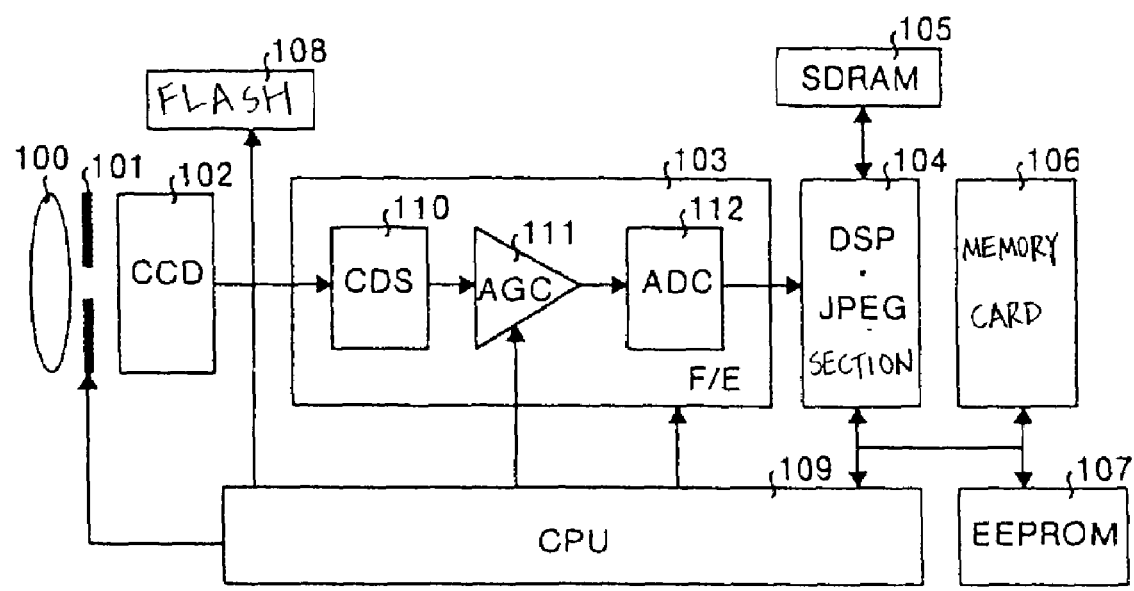
FIG. 1 is a block diagram showing the configuration of an image pickup device according to a first embodiment of the present invention.

A first embodiment of this invention will be explained below. FIG. 1 is a block diagram showing the configuration of an image pickup device in the first embodiment. This configuration shown in FIG. 1 represents a digital image pickup device provided with a flash 108. The digital image pickup device includes a charge-coupled device (CCD) 102 which picks up an image of a subject, an electrically erasable programmable read only memory (EEPROM) 107 which records a correction table used to correct data for an image picked up ("image pickup data") by the CCD 102 during photographing using the flash 108, a front end processor 103 which corrects the image pickup data picked up by the CCD 102 using the correction table recorded on the EEPROM 107, a digital signal processor/joint photographers expert group (DSP/JPEG) processor 104, and a central processing unit (CPU) 109.

The front end processor 103 includes a correlation dual sampling circuit (CDS) 110 which samples and holds analog image pickup data to be input from the CCD 102, an automatic gain controller (AGC) 111 which detects a variation of amplitude of the image pickup data and automatically controls the gain of an amplifier so as to keep an output signal constant, an analog-to-digital converter (ADC) 112 which converts an analog signal to a digital signal.

The CPU 109 controls all the other constituent elements of the pickup device shown in FIG. 1. The CPU 109 conducts white balance setting, auto exposure (AE) and auto focus (AF) controls, and operation parameters settings which are performed by the front end processor 103 and the DSP/JPEG processor 104.

In the first embodiment, the CPU 109 acquires an image evaluation value (image frequency information) of the image pickup data which is output from the CCD 102. The CPU 109 measures a distance between an auto-focusing section 101 and a subject from the number of pulses which are generated when the auto-focusing section 101 is driven to perform an AF operation based on the acquired evaluation value.

The digital camera shown in FIG. 1 also includes a lens 100 and the auto-focusing section 101 which focuses an image input through the lens 100. The digital camera shown in FIG. 1 further includes a synchronous dynamic random access memory (SDRAM) 105 which records image pickup data converted to digital data by the ADC 112, and a memory card 106 which records the image pickup data which is processed by the DSP/JPEG section 104.

The digital camera constituted as explained above performs the following operations. The analog image pickup data which is output from the CCD 102 is converted to digital data (Rawdata) by the front end processor 103, and the digital data is stored in the SDRAM 105. The digital image pickup data at this time is arranged in the same manner as that of the analog image pickup data.

The DSP/JPEG processor 104 reads the image pickup data which is stored in the SDRAM 105 and subjects the read-out image pickup data to DSP-related processing, thereby generates a luminance signal (Y) and a color signal (C). This DSP-related processing is also referred to as "camera signal processing". The image pickup data is subjected to JPEG processing and compressed. The compressed image pickup data is recorded on the memory card 106.

If photographing using the flash 108 ("stroboscopic photographing") is performed, the image pickup device corrects the image pickup data based on the correction table recorded on the EEPROM 107. The image pickup data can be corrected by the AGC 111 in the front end processor 103 or the DSP/JPEG processor 104. Respective correction tables used to correct the image pickup data by the AGC 111 and to correct the image pickup data by the DSP/JPEG processor 104 will now be explained.

Figure 2A:
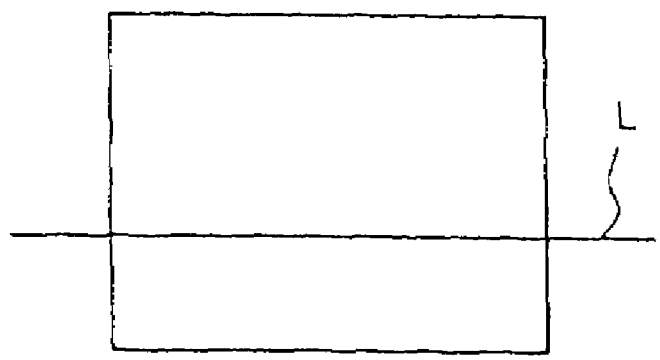
FIG. 2A and FIG. 2B show a light quantity distribution during stroboscopic photographing.
Figure 2B:

FIG. 2A and FIG. 2B show a light quantity distribution during stroboscopic photographing. FIG. 2A shows a direction, as line L, to which a subject such as a paper sheet having a uniform surface is picked up. FIG. 2B shows a relationship (light quantity distribution) between a direction H along the line L and a luminance signal Y in the image of the subject thus picked up. If the subject is photographed using a flash particularly from a short distance, the light quantities at both end portions of the subject are lower than that in a region near the center of the line L. This characteristic is more significant as the distance between the image pickup optical system and the flash is longer.

The correction table used to correct the image pickup data by the AGC 111 is set as the correction table of gain which shows the opposite characteristic of the digital camera to that shown in FIG. 2B. When the image pickup data is corrected by the DSP/JPEG processor 104, the correction table is set as a correction coefficient table for again amplifier which shows the opposite characteristic of the digital camera to that shown in FIG. 2B. It is noted that each digital camera has a unique characteristic of light quantity distribution.

Figure 3:
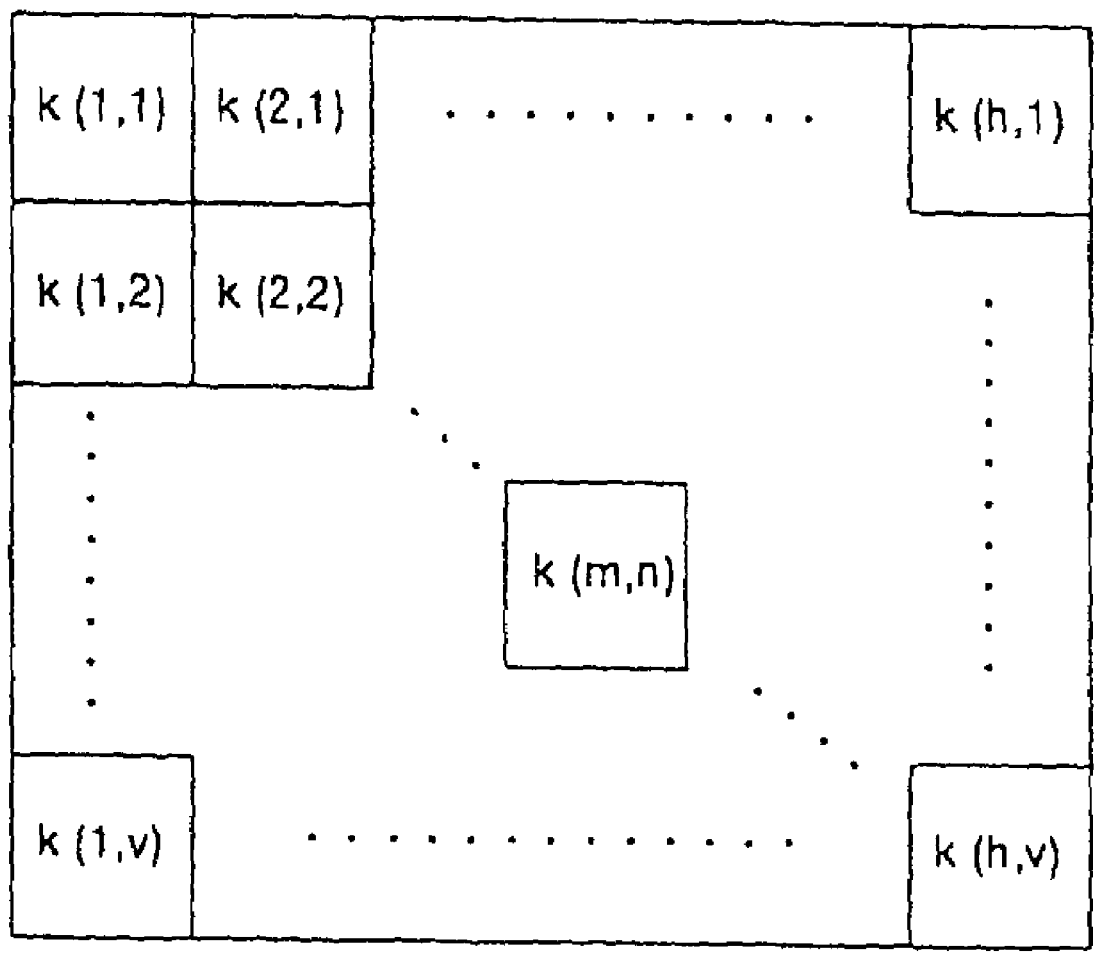
FIG. 3 shows a correction table which is used when image pickup data is corrected by an AGC.

FIG. 3 is a diagram showing the correction table used to correct the image pickup data by the AGC 112. Pieces of data k(1, 1), . . . and k(h,v) are correction data included in the correction table and correspond to each pixel of the CCD 102, respectively. If the CCD 102 has three million pixels and symbols h and v are set to be as far as 2048 and 1536, respectively, then the correction table can be set so that all the pixels of the CCD 102 can individually be corrected.

If the image pickup data is corrected by the AGC 112, the CPU 109 reads the respective data k(1, 1), . . . and k(h,v) of the correction table shown in FIG. 3 from the EEPROM 107 and outputs the respective data to the AGC 111. The AGC 111 performs gain control processing while correcting the gains of the respective pixels obtained in such a manner as ordinary AE operation, based on the correction data input from the CPU 109.

Figure 4:
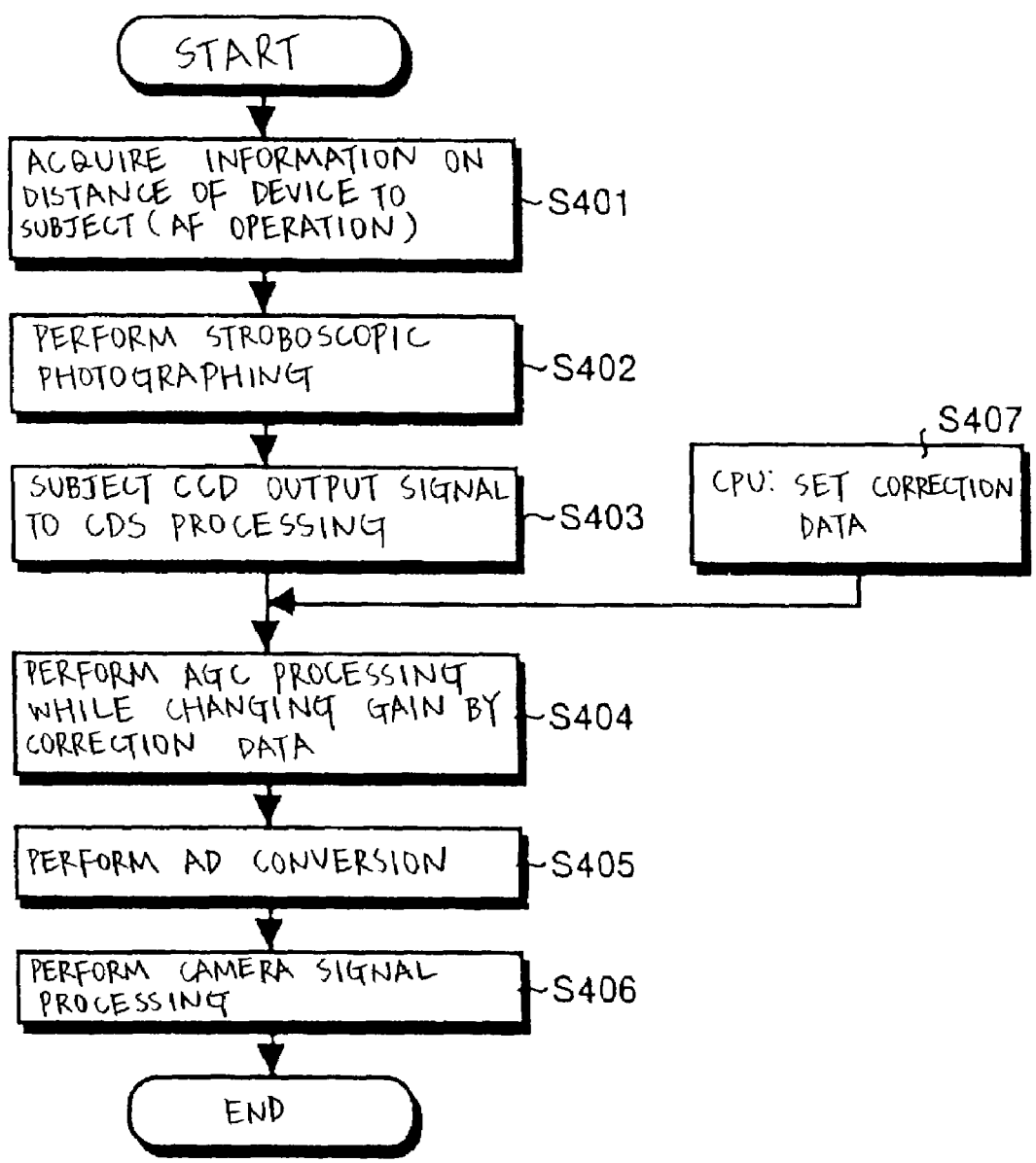
FIG. 4 is a flow chart of processing performed by the AGC when image pickup data is corrected.

Processing performed by the AGC 112 to correct the image pickup data will be explained with reference to the flow chart of FIG. 4. The digital camera first acquires information on the distance of the digital camera to a subject using the number of pulses which are generated during AF operation (step S401). The subject is photographed using a flash (step S402). A signal (image pickup data) output from the CCD 102 is subjected to CDS processing (sampled and held) by the CDS 110 (step S403).

The CPU 109 reads correction data from the correction table stored in the EEPROM 107 and sets the correction data in the AGC 111 (step S407). The AGC 111 conducts automatic gain control to the image pickup data while changing gains based on the set correction data (step S404). The image pickup data subjected to automatic gain control is converted to digital data by the ADC 112 (step S405) and then subjected to camera signal processing (step S406).

The correction coefficient table used to correct the image pickup data by the DSP/JPEG processor 104 will be explained below. FIG. 5 is a block diagram showing the configuration of the DSP/JPEG processor 104 which performs camera signal processing. Four pieces of raw data (R, Gr, Gb, and B) from the CCD are input into the DSP/JPEG processor 104 where these four pieces of data are branched into four color signals by a multiplexer 502 and fed to variable gain amplifiers 503a to 503d, respectively. The amplifiers 503a to 503d are used to perform correction and setting of white balance (WB) of the present invention.

The gains of the variable gain amplifiers 503a to 503d are controlled by the CPU. When an operation according to the first embodiment is to be performed, gain tables by as much as the number of all the pixels of the CCD are used. The tables are stored in the EEPROM 107 shown in FIG. 1. The DSP/JPEG processor 104 also includes an evaluation value generation block. The evaluation value generation block operates four integrated values of, for example, $\Sigma R$, $\Sigma Gr$, $\Sigma Gb$, and $\Sigma B$ to thereby generate an evaluation value. The CPU 109 determines the state of the image from the evaluation value thus generated and performs setting of WB and corrections to the respective signals. The signals passing through the variable gain amplifiers 503a to 503d, respectively, are transformed to RGB signals by a 4×3 matrix 504 provided in the next stage and fed to a luminance signal/color signal processor.

FIG. 6 is a flow chart of processing performed by the DSP/JPEG processor 104 when the processor 104 corrects image pickup data. The digital camera first acquires information on the distance of the digital camera to a subject using the number of pulses which are generated during an AF operation (step S601). The subject is photographed using a flash (step S602). A signal (image pickup data) output from the CCD 102 is subjected to CDS processing (sampled and held) by the CDS 110 (step S603).

The image pickup data thus CDS processed is output to the AGC 111 and the gain of the image pickup data is controlled by the AGC 111 (step S604). The ADC 112 converts the data to digital data (step S605) and further subjects the digital data to camera signal processing (step 606). At this moment, the CPU 109 reads the correction coefficient table from the EEPROM 107 and sets correction coefficients as the coefficients of the variable gain amplifiers that are set according to the pixels of the CCD (step S607).

According to the image pickup device of the first embodiment explained so far, it is possible to provide an image pickup device which can prevent the degradation of image quality due to an uneven luminous intensity distribution and which can form a high-quality image even if a subject is photographed using the flash from a relatively short distance. In addition, according to the image pickup device of the first embodiment, there is no need to locate the flash at a position near the optical system in the digital camera, thereby making it possible to improve the degree of freedom to design the layout of the digital camera.

According to the first embodiment, the hardware configurations of the circuits and the flash are not changed. Therefore, it is possible to prevent the circuits mounted on the digital camera from being complicated in configuration, made large in size and to prevent cost from increasing. Thus, it is possible to correct the uneven luminous intensity distribution without preventing the digital camera from being made smaller in size and lighter in weight and preventing the cost thereof from increasing.

Figure 7A:
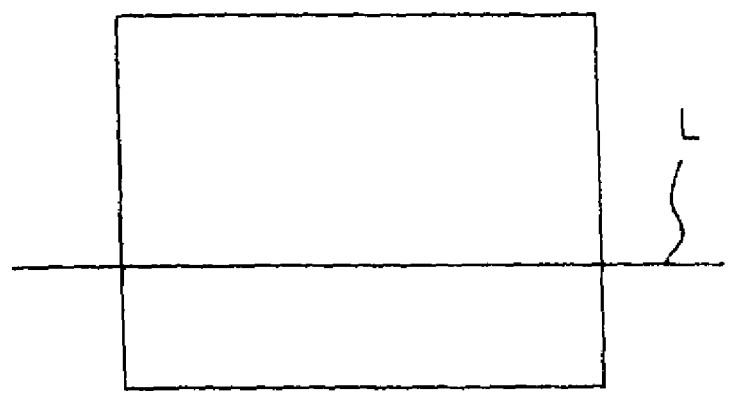
FIG. 7A and FIG. 7B show an uneven luminous intensity distribution caused by shading.
Figure 7B:
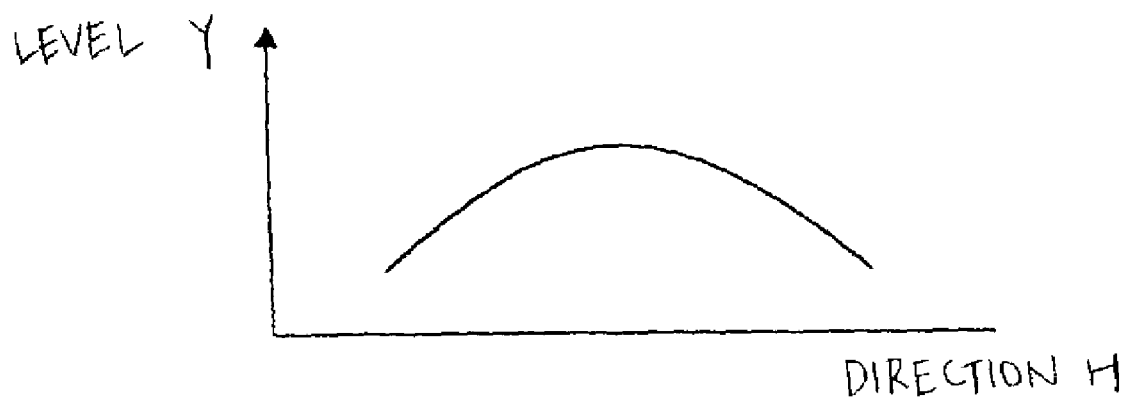

The present invention is not limited to the configuration which has been explained so far but may have the following configuration. For example, the digital image pickup device normally performs shading correction to correct the uneven luminous intensity distribution of an image pickup region which occurs because of the shading. FIGS. 7A and 7B explain an uneven luminous intensity distribution caused by shading. When the image of a line L shown in FIG. 7A is picked up, the uneven luminous intensity distribution caused by shading is represented as a decrease in the light quantity of the end portions of the line L as shown in FIG. 7B.

According to the image pickup device explained in the first embodiment, a correction characteristic for subjecting image pickup data to shading correction can be also added to the correction table. The correction characteristic is an opposite characteristic to the light quantity distribution shown, for example, in FIG. 7B. The correction table or correction coefficient table of the gain amplifier is set in the EEPROM 107. More specifically, the correction table shows the opposite characteristic to the characteristic obtained by adding the light quantity distribution shown in FIG. 7B to the light quantity distribution shown in FIG. 2B. By thus setting, the image pickup device can simultaneously execute the correction during stroboscopic photographing and shading correction.

Figure 8:
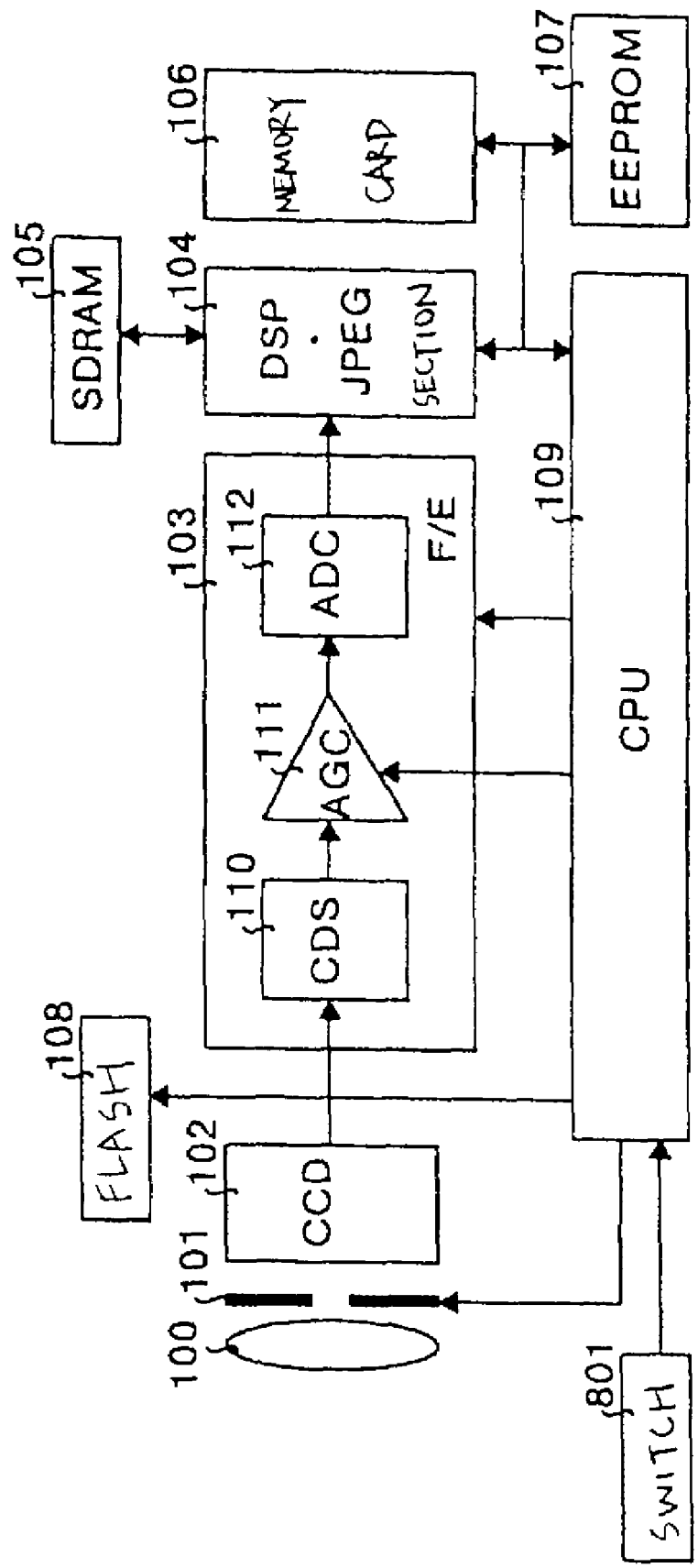
FIG. 8 is a diagram showing an image pickup device provided with a switch for selecting whether to execute image pickup data correction or not.

The luminous intensity distribution during stroboscopic photographing is often influenced by external light. In this case, a trouble may occur when image pickup data is corrected using the correction data as explained in the first embodiment. To prevent this possible disadvantage, as shown in FIG. 8, the image pickup device according to the present invention may include a switch 801 in addition to the constituent elements shown in FIG. 1. This switch 801 is used to select whether or not the image pickup data is to be corrected. Therefore, an operator can select execution or non-execution of the correction using the switch. Alternatively, according to the present invention, the CPU 109 automatically detects an uneven luminous intensity distribution from the image pickup data picked up by the CCD 102 and determines whether or not correction is to be executed.

According to the image pickup device of the first embodiment, the correction of image pickup data on a binary image such as a character image can be executed by lowering correction accuracy. The correction accuracy can be lowered by, for example, setting the resolution of the correction table to be coarse. Alternatively, the correction accuracy can be lowered by lowering the resolution (the number of bits) of each correction data k(m, n).

A threshold table is generally required for processing of image pickup data for a binary image. In the first embodiment, the image pickup data for the binary image is processed using the threshold table in which thresholds multiplied by the respective correction data set in the correction table shown in FIG. 3 are set, and it is thereby possible to correct the uneven luminous intensity distribution caused by the flash simultaneously with the binarization of the image pickup data.

A second embodiment of this invention will be explained below. An image pickup device of the second embodiment has the same configuration as that of the first embodiment, and therefore the constituent elements of the image pickup device are not explained or shown in the drawings partially. In the image pickup device of the second embodiment, the EEPROM 107 holds a plurality of correction tables explained in the first embodiment. In addition, the CPU 109 corrects image pickup data using the correction table which corresponds to a distance between the device and a subject measured from the number of pulses which are generated when the auto-focusing section 101 is driven or the distance measured by an external AF sensor 901.

That is, the image pickup device of the second embodiment stores in the EEPROM 107 a plurality of correction tables which correspond to the distances between the digital camera and a subject, respectively. The CPU 109 measures the distance of the digital camera to the subject, selects and reads the correction table which corresponds to the obtained distance, and sets the read correction table in the AGC 111 or the DSP/JPEG processor 104. An uneven luminous intensity distribution during stroboscopic photographing changes according to the distance to the subject. Therefore, according to the image pickup device of the second embodiment, it is possible to correct the image pickup data using correction data which corresponds to an uneven luminous intensity distribution closer to an actual uneven luminous intensity distribution and to correct the image pickup data more appropriately.

If there is no correction table which corresponds to the distance obtained by measurement in the EEPROM 107, the image pickup device of the second embodiment corrects the image pickup data by linear interpolation using the correction table stored in the EEPROM 107. According to the image pickup device of the second embodiment, the image pickup data can be corrected more appropriately while the number of correction tables to be stored is suppressed.

Figure 9:
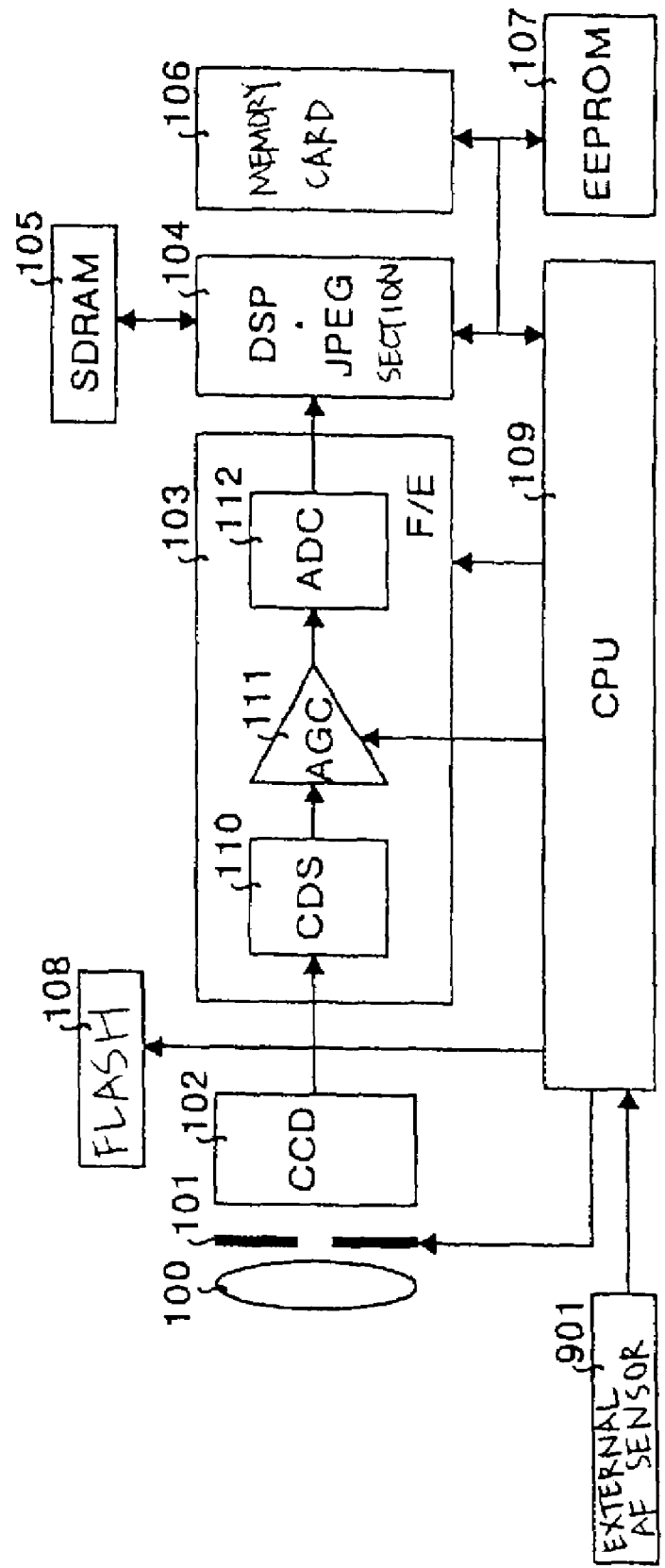
FIG. 9 is a diagram which explains an image pickup device provided with an external AF sensor.

The image pickup device of the second embodiment is not limited to the configuration in which the distance of the device to the subject is measured from the number of pulses which are generated when the auto-focusing section 101 is driven. The image pickup device may also include an external AF sensor 901 as shown in FIG. 9. If including the external AF sensor 901, the image pickup device of the second embodiment selects the correction table which corresponds to the distance measured by the AF sensor 901 and uses the table for correcting the image pickup data.

A third embodiment of this invention will be explained below, and an image pickup device of the third embodiment will be explained. The image pickup device of this embodiment has the same configuration as the image pickup device shown in FIG. 1 or FIG. 9. Therefore, the constituent elements of the image pickup device of this embodiment will not be explained or shown in the drawings partially. The third embodiment is provided to solve the problem as follows. That is, when a binary image is to be picked up, binarization accuracy is higher as signal level is higher. If the light emission quantity of the flash is increased excessively so as to increase the signal level, a white void or white voids may occur in a picked-up image.

In the third embodiment, when the digital camera picks up a binary image, the CCD 102 controls the flash 108 so as to emit light at least twice in different light quantities to pickup an image of a subject. The CPU 109 then corrects image pickup data using the data for the images picked-up in different light quantities.

In the third embodiment, the CPU 109 controls the CCD 102 and the flash 108 to photograph the subject twice. This photographing is performed by changing the quantity of light emitted from the flash. The larger quantity of light emission is set as light emission quantity 1 and the smaller quantity of light emission is set as light emission quantity 2. The light emission quantity 1 is set to a quantity in which a sufficient signal level for necessary binarization accuracy is obtained. The light emission quantity 2 is set to a quantity in which no white void occurs.

In the third embodiment, the CPU 109 controls the CCD 102 to photograph a binary image of the subject in the light emission quantity 1 for the first time. Image pickup data (image pickup data 1) obtained by the first photographing is stored in the SDRAM 105. The image pickup data 1 is read and subjected to SD processing and JPEG processing. The CPU 109 then controls the CCD 102 to pick up the binary image in the light emission quantity 2. The image pickup data (image pickup data 2) obtained at this time is stored in a different area of the SDRAM 105 from that where the image pickup data 1 is stored, and subjected to the SD processing and JPEG processing. The uneven luminous intensity distribution of the image pickup data is corrected by the AGC 111 or the DSP/JPEG processor 104 during the respective processing in the same manner as that in the first and second embodiments.

In the third embodiment, the CPU 109 then replaces a portion in the image pickup data 1 in which a white void occurs, with a corresponding portion in the image pickup data 2 to thereby correct the image pickup data 1. In the image pickup device of the third embodiment, if the CCD 102 is constituted to perform interlace reading, a time difference between the two stroboscopic photographing operations grows. As the CCD 102, it is therefore desirable to employ a CCD for entire pixel reading which transfers accumulated charges at one time such as a frame transfer type CCD.

FIG. 10 is a flow chart of processing performed by the image pickup device of the third embodiment. In the image pickup device of the third embodiment, the flash 108 is controlled to emit stronger light (emit light in the light emission quantity 1) to photograph a subject (step S1001) Image pickup data obtained by this photographing is converted to digital data by the front end processor 103 and subjected to camera signal processing by the DSP/JPEG processor 104 (step S1002). The image pickup data subjected to the camera signal processing is denoted as Y data which indicates luminance in the flow chart.

The Y data (Y1) obtained through the processing at step S1002 is stored in the SDRAM 105 (step S1003). The CPU 109 searches the address of a white void pixel from the stored Y1 data (step S1004) and stores the searched pixel address in, for example, a different area of the SDRAM 105.

The CPU 109 then controls the flash 108 to emit weaker light (emit light in the light emission quantity 2) to photograph the subject (step S1006). Image pickup data obtained by this photographing is converted to digital data by the front end processor 103 and subjected to the camera signal processing by the DSP/JPEG processor 104 (step S1007). Y data (Y2 data) obtained through the processing at step S1007 is stored in the SDRAM 105 (step S1008).

The CPU 109 replaces the pixel at the address which is stored at step S1005 with a pixel at the corresponding address of the data Y2. The data Y1 in which the pixel is replaced is denoted as data Y (step S1009). The data Y is binarized under the control of the CPU 109 (step S1010), thereby completing the processing shown in FIG. 10. The binarized data Y is stored in, for example, the memory card 106.

According to the third embodiment explained so far, if the binary image is to be picked up, it is possible to generate image pickup data using optimum data for the respective portions of the image and to prevent any white void from occurring in the center of the image while preventing the periphery of the image from darkening.

The image pickup device according to one aspect of this invention can correct the data for a picked-up image based on the light quantity distribution when a subject is photographed using a flash. Therefore, it is advantageously possible to provide the image pickup device which can obtain a high-quality image irrespective of the distance of the device to the subject when the subject is photographed using the flash, and prevent the circuit configuration of the device from being upsized.

Moreover, the image pickup data can be more accurately corrected using the light quantity distribution correction table which corresponds to the distance measured by a distance measurement unit. Therefore, it is advantageously possible to provide the image pickup device which can obtain a higher-quality image irrespective of the distance of the device to a subject when the subject is photographed using the flash.

Furthermore, the image pickup data can be corrected by linear interpolation using the light quantity distribution correction table stored in the correction table recording unit. Therefore, it is advantageously possible to deal with image pickup data if a subject is present at various distances from the device.

Moreover, the shading correction can be simultaneously executed with the correction of the light quantity distribution. Therefore, it is advantageously possible to provide the image pickup device which can obtain a high-quality image without lengthening the processing time.

Furthermore, when the image pickup data for a binary image is corrected, it is advantageously possible to reduce a calculation time required for correcting the binary image as compared to that required for correcting a multilevel image.

Moreover, binarization processing can be simultaneously executed with the correction of image pickup data for a binary image. Therefore, it is advantageously possible to further reduce a calculation time required for correcting the binary image as compared to that required for correcting a multilevel image.

Furthermore, the data for a picked-up image can be corrected using respective pieces of data for the image picked up in different light quantities. Therefore, it is advantageously possible to provide the image pickup device which can generate image pickup data using optimum data for the respective portions of the image and to simultaneously realize avoidance of darkening of the periphery of the image and prevention of occurrence of any white void in the center of the image.

Moreover, by employing the CCD which transfers all accumulated charges at one time, a time difference between the two stroboscopic photographing operations is reduced. Therefore, it is advantageously possible to prevent the processing time for correction from being lengthened.

Furthermore, by allowing an operator to select whether to execute correction of the image pickup data, the correction error due to the influence of external light is minimized. Therefore, it is advantageously possible to provide the image pickup device which can improve the satisfaction of the user.

The image pickup method according to another aspect of this invention comprises correcting the data for a picked-up image based on the light quantity distribution when a subject is photographed using a flash. Therefore, it is advantageously possible to provide the image pickup method capable of obtaining a high-quality image irrespective of the distance of the image pickup device to the subject when the subject is photographed using the flash.

The present document incorporates by reference the entire contents of Japanese priority document, 2001-270852 filed in Japan on Sep. 6, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image pickup device with a flash, the image pickup device comprising:
    an image pickup unit configured to pick up an image of a subject;
    a correction table recording unit configured to record a light quantity distribution correction table used to correct data for the image picked up by the image pickup unit, based on a light quantity distribution when the subject is photographed using the flash;
    an image pickup data correction unit configured to correct the data for the picked-up image, using the light quantity distribution correction table;
    a distance measurement unit configured to measure a distance between the image pickup unit and the subject, wherein
    the correction table recording unit is further configured to store a plurality of the light quantity distribution correction tables, each light quantity distribution correction table corresponding to a respective distance between the image pickup unit and the subject, and
    the image pickup data correction unit is further configured to correct the data for the picked-up image using one of the plurality of the light quantity distribution correction tables which corresponds to the distance measured by the distance measurement unit.

2. The image pickup device according to claim 1, wherein the image pickup data correction unit is further configured to correct the data for the image picked up, in such a distance that the distance between the image pickup unit and the subject is beyond a range indicated in the light quantity distribution correction table stored in the correction table recording unit, by linear interpolation of at least two of the plurality of the light quantity distribution correction tables stored in the correction table recording unit.

3. The image pickup device according to claim 1, wherein a shading correction characteristic for the image pickup data is further added to at least one of the plurality of the light quantity distribution correction tables.

4. The image pickup device according to claim 1, wherein the image pickup data correction unit is further configured to lower correction accuracy when image pickup data for a binary image is corrected.

5. The image pickup device according to claim 1, wherein the image pickup data correction unit is further configured to correct the data for a picked-up binary image by using a light quantity distribution correction table multiplied by a threshold for image binarization.

6. The image pickup device according to claim 1, wherein when a binary image is to be picked up, the image pickup unit is configured to pick up the binary image by emitting light from the flash at least twice in different light quantities, and
    the image pickup data correction unit is configured to correct the data for the picked-up image using the data for the images picked up in the different light quantities.

7. The image pickup device according to claim 6, wherein the image pickup unit is further configured to transfer all accumulated charges at one time.

8. The image pickup device according to claim 1, further comprising a correction select unit configured to select whether to execute correction of the image pickup data by the image pickup data correction unit.

9. An image pickup method comprising the steps of:
    picking up an image of a subject;
    recording a light quantity distribution correction table used to correct data for the image picked up in the image pickup step, based on a light quantity distribution when the subject is photographed using the flash;
    correcting the data for the picked-up image, using the light quantity distribution correction table; and
    measuring a distance between the image pickup unit and the subject, wherein
    the recording step includes storing a plurality of the light quantity distribution correction tables, each light quantity correction distribution correction table corresponding to a respective distance between the image pickup unit and the subject, and the correcting step includes correcting the data for the picked-up image using one of the plurality of the light quantity distribution correction tables which corresponds to the distance measured in the measuring step.

10. The image pickup method according to claim 9, wherein the correcting step includes correcting the data for the image picked up, in such a distance that the distance between the image pickup unit and the subject is beyond a range indicated in the light quantity distribution correction table stored in the correction table recording step, by linear interpolation of at least two of the plurality of the light quantity distribution correction tables stored in the recording step.

11. The image pickup method according to claim 9, wherein a shading correction characteristic for the image pickup data is further added to at least one of the plurality of the light quantity distribution correction tables.

12. The image pickup method according to claim 9, wherein the correcting step lowers correction accuracy when image pickup data for a binary image is corrected.

13. The image pickup method according to claim 9, wherein the correcting step includes correcting the data for a picked-up binary image using a light quantity distribution correction table multiplied by a threshold for image binarization.

14. The image pickup method according to claim 9, wherein when a binary image is to be picked up, the picking step includes picking up the binary image by emitting light from the flash at least twice in different light quantities, and the correcting step includes correcting the data for the picked-up image using the data for the images picked up in the different light quantities.

15. The image pickup method according to claim 14, wherein the picking step includes transferring all accumulated charges at one time.

16. The image pickup method according to claim 9, further comprising selecting whether to execute correction of the data for the picked-up image in the image pickup data correcting step.

* * * * *